US012234784B1

United States Patent
(12) United States Patent
Kiwan et al.

(10) Patent No.: US 12,234,784 B1
(45) Date of Patent: Feb. 25, 2025

(54) METHODS AND SYSTEMS FOR VERIFYING OXYGEN SENSOR CONNECTIONS

(71) Applicant: Ford Global Technologies, LLC, Dearborn, MI (US)

(72) Inventors: Rani Kiwan, West Bloomfield, MI (US); Chris Paul Glugla, Macomb, MI (US); Michael Uhrich, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/793,568

(22) Filed: Aug. 2, 2024

(51) Int. Cl.
*F02D 41/14* (2006.01)
*F02D 41/12* (2006.01)
*F02D 41/22* (2006.01)

(52) U.S. Cl.
CPC ....... *F02D 41/1495* (2013.01); *F02D 41/126* (2013.01); *F02D 41/1443* (2013.01); *F02D 41/1454* (2013.01); *F02D 41/1475* (2013.01); *F02D 41/222* (2013.01); *F01N 2560/025* (2013.01); *F01N 2560/14* (2013.01); *F01N 2900/0408* (2013.01); *F01N 2900/0416* (2013.01)

(58) Field of Classification Search
CPC ........... F01N 2560/025; F01N 2560/14; F01N 2900/0408; F01N 2900/0416; F02D 41/126; F02D 41/1443; F02D 41/1454; F02D 41/1475; F02D 41/1495
USPC .................................. 60/274, 276, 285, 323
See application file for complete search history.

(56) References Cited

U.S. PATENT DOCUMENTS

| | | | | | |
|---|---|---|---|---|---|
| 5,528,932 | A * | 6/1996 | Bauer | F02D 41/1454 73/23.31 |
| 6,092,413 | A * | 7/2000 | Busch | F02D 41/1443 73/114.73 |
| 7,421,836 | B2 | 9/2008 | Pallett et al. | |
| 7,558,667 | B2 | 7/2009 | Kida | |
| 11,732,668 | B1 | 8/2023 | Glugla et al. | |
| 2021/0348575 | A1 | 11/2021 | Wagner | |

OTHER PUBLICATIONS

Kiwan, R. et al., "Methods and Systems for V8 Engine Fuel Control," U.S. Appl. No. 18/793,530, filed Aug. 2, 2024, 30 pages.

* cited by examiner

*Primary Examiner* — Jorge L Leon, Jr.
(74) *Attorney, Agent, or Firm* — Vincent Mastrogiacomo; McCoy Russell LLP

(57) ABSTRACT

Systems and methods for detecting and compensating miswiring of oxygen sensors of a cylinder bank of an engine are disclosed. In one example, fuel control parameters are monitored to determine whether or not the fuel control parameters diverge to fuel control thresholds. If so, a controller may switch which cylinder's equivalence ratios are adjusted in response to output of a particular oxygen sensor.

20 Claims, 6 Drawing Sheets

METHODS AND SYSTEMS FOR VERIFYING OXYGEN SENSOR CONNECTIONS

FIELD

The present description relates to a system and methods for verifying oxygen sensor connections for an engine. The methods may be particularly useful for V8 engines.

BACKGROUND AND SUMMARY

Closed-loop fuel control has increased accuracy of engine air-fuel control. Many closed loop fuel control systems apply a sole universal electrically heated oxygen (UEGO) sensor as a feedback sensor for closed-loop fuel control of a cylinder bank (e.g., four cylinders that share a common cylinder head). The sole oxygen sensor provides feedback for adjusting air-fuel ratios or equivalence ratios for the bank of cylinders. The bank of cylinders may also share a common exhaust manifold. The sole oxygen sensor may be exposed to a mixture of gases from all cylinders that share the common exhaust manifold.

Cylinder firings may be unevenly spaced with 90°, 180°, 270°, 180° cylinder firing intervals on cross-plane crankshaft V8 engines. The uneven firing intervals may cause variation among cylinders (of same cylinder bank) in residency times of exhaust pulses at oxygen sensors. The discrepancy in residency times may deteriorate the capability of an air-fuel ratio imbalance diagnostic when a sole oxygen sensor is used for each bank of cylinders on a cross-plane crank V8. The air-fuel ratio imbalance diagnostic and fuel control may be addressed by adding a second oxygen sensor on each bank of cylinders. However, miswiring of the same-bank oxygen sensors may be detrimental for fuel control (e.g., feedback control instability) and emissions.

The inventors herein have recognized the above-mentioned disadvantages and have developed a method for operating an engine, comprising: monitoring exhaust gases of a first group of cylinders of a cylinder bank of the engine via a first oxygen sensor; monitoring exhaust gases of a second group of cylinders of the cylinder bank via a second oxygen sensor; and switching cylinders associated with the first group of cylinders and switching cylinders associated with the second group of cylinders in response to an indication of miswiring of one of the first oxygen sensor and the second oxygen sensor.

By switching cylinders that are associated with the first group of cylinders and switching cylinders that are associated with the second group of cylinders in response to an indication of miswiring of one of the first oxygen sensor and the second oxygen sensor, it may be possible to reduce a possibility of exceeding threshold emissions levels during operation of a fuel control system.

The present description may provide several advantages. In particular, the approach may reduce variation engine air-fuel ratio variation and increase capability of an air-fuel ratio imbalance diagnostic. Additionally, the approach may correct miswiring of oxygen sensors without having to rewire the oxygen sensors. Further, the approach may be applied to different fuel control strategies.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to diagnosing operation of a fuel control system of an internal combustion engine. A fuel injected engine may include one oxygen sensor for each group of two cylinders and fuel injectors. The engine's wiring harness may include wires and connectors for each oxygen sensor. In order to control financial expense of an engine control system, connectors for all of the engine's oxygen sensors may be the same. Further, since oxygen sensors of a cylinder bank may be in close proximity to each other, it may be possible to connect wiring from a first oxygen sensor to a connector that leads to controller inputs for a second oxygen sensor. Further, it may be possible to connect wiring from the second oxygen sensor to a connector that leads to controller inputs for a first oxygen sensor. Thus, it may be possible to miswire an engine's oxygen sensors to an engine controller. However, the approach described herein provides for correcting a case of miswiring without having to move connectors or take a vehicle in for service. Instead, the controller makes internal adjustments to compensate for the miswired oxygen sensors.

Figure 1:
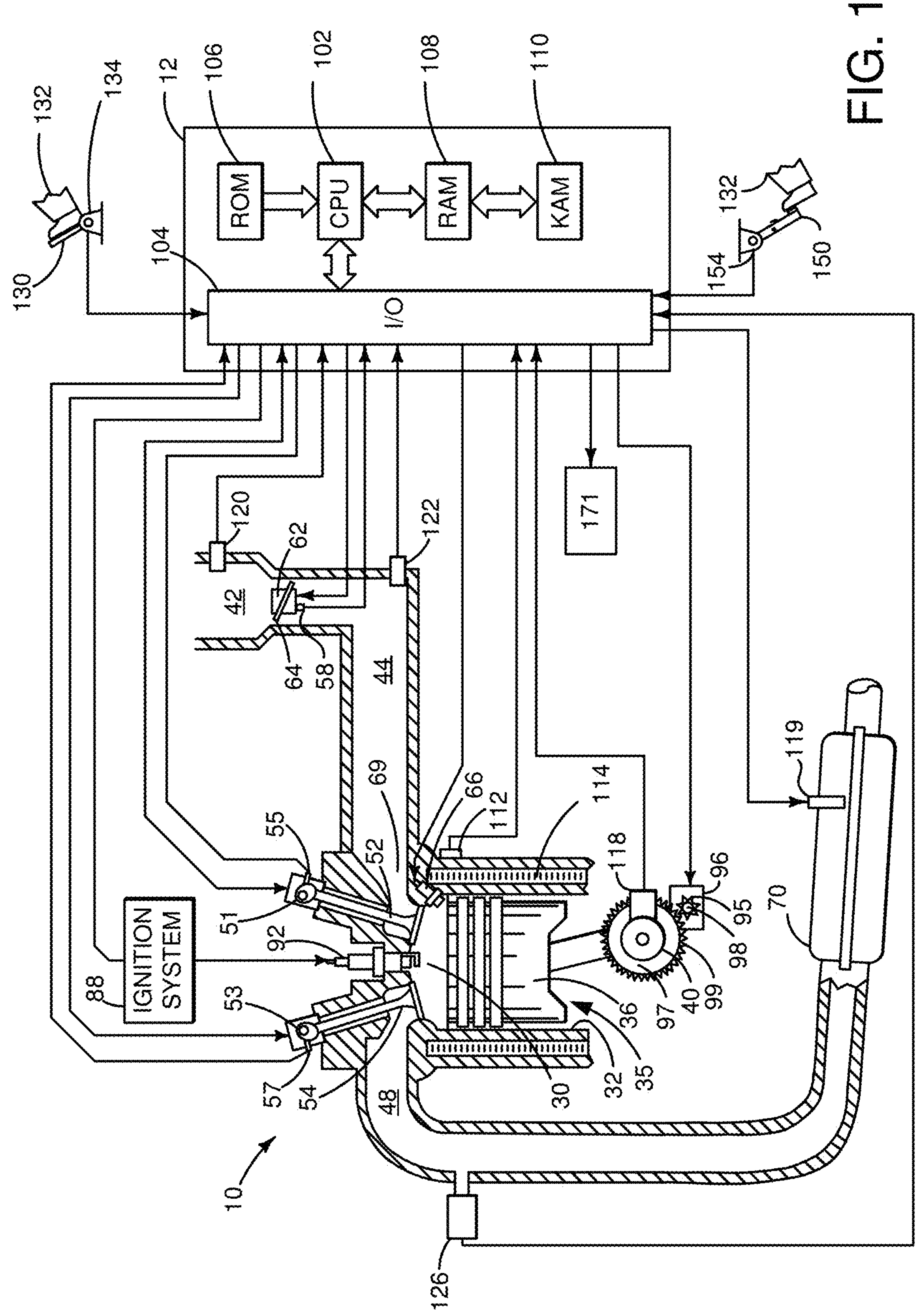
FIG. 1 is a schematic diagram of a single cylinder of an engine.
Figure 2:
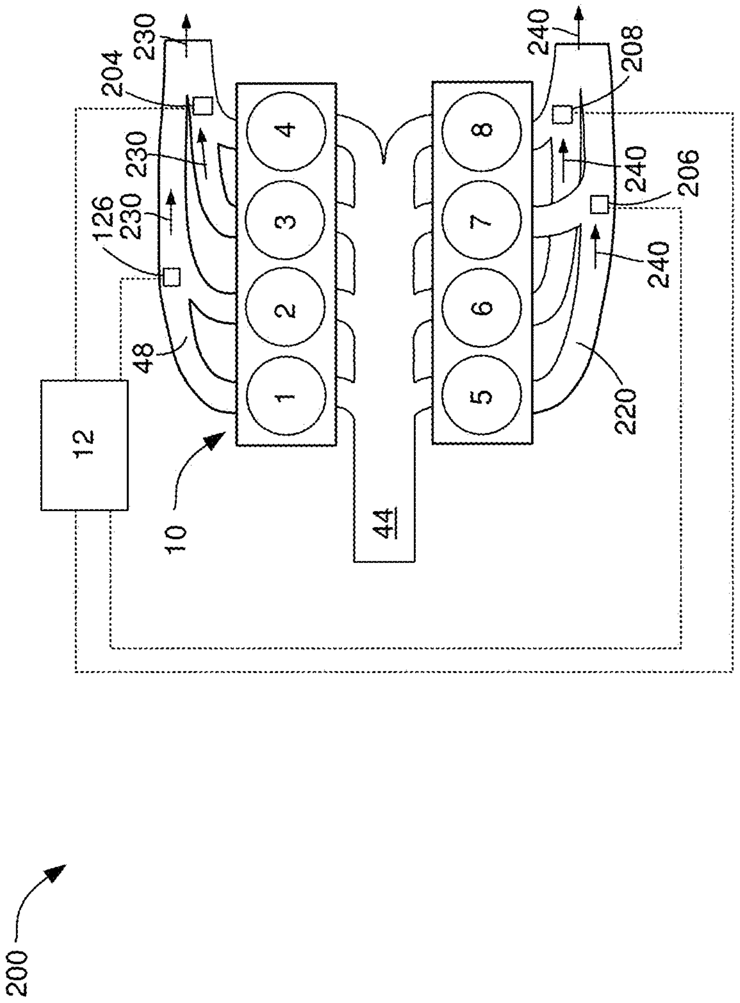
FIG. 2 is a schematic diagram of an eight-cylinder engine.
Figure 3:
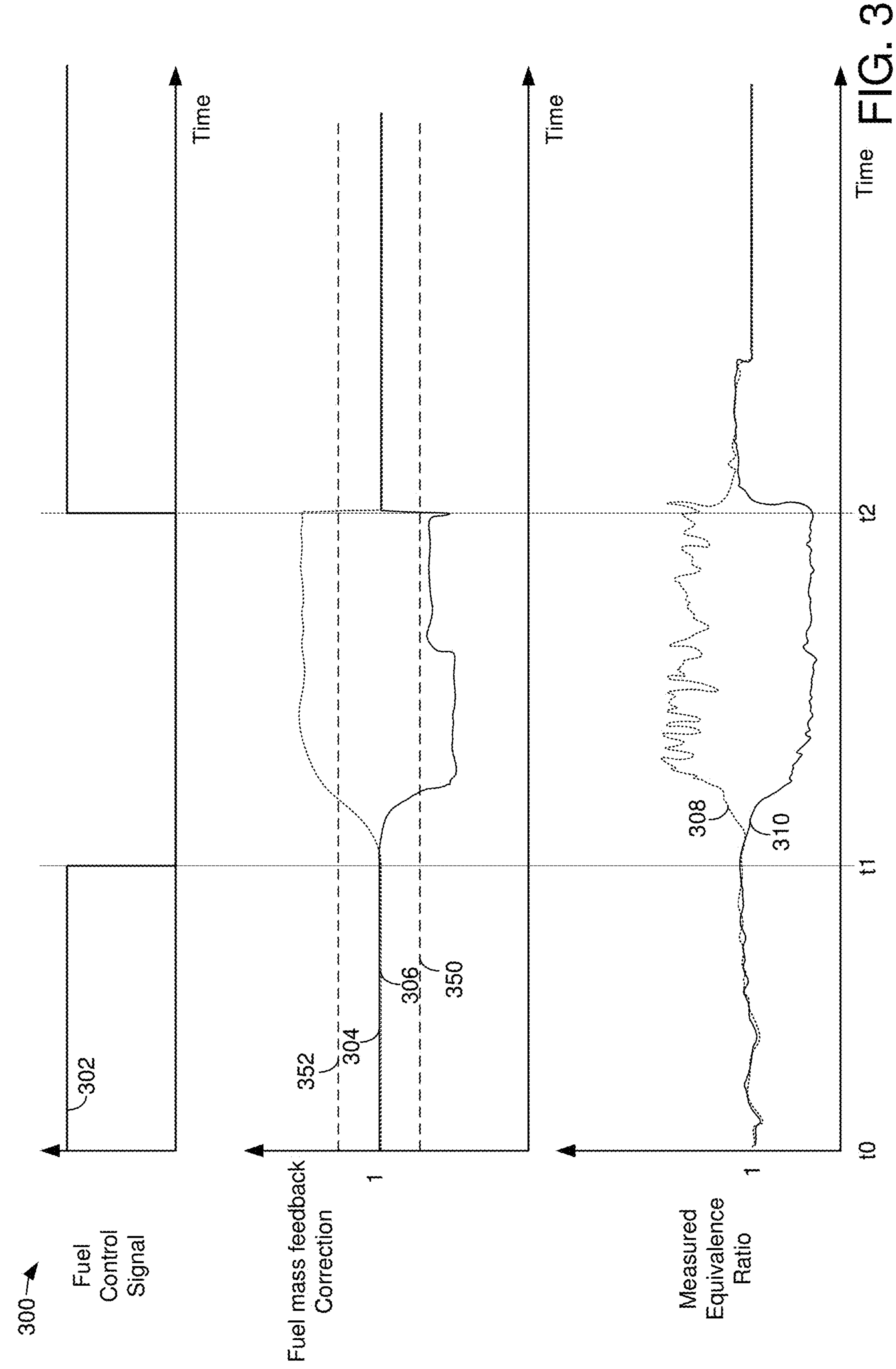
FIGS. 3-5 show prophetic example operating sequenced for diagnosing engine operation.
Figure 4:
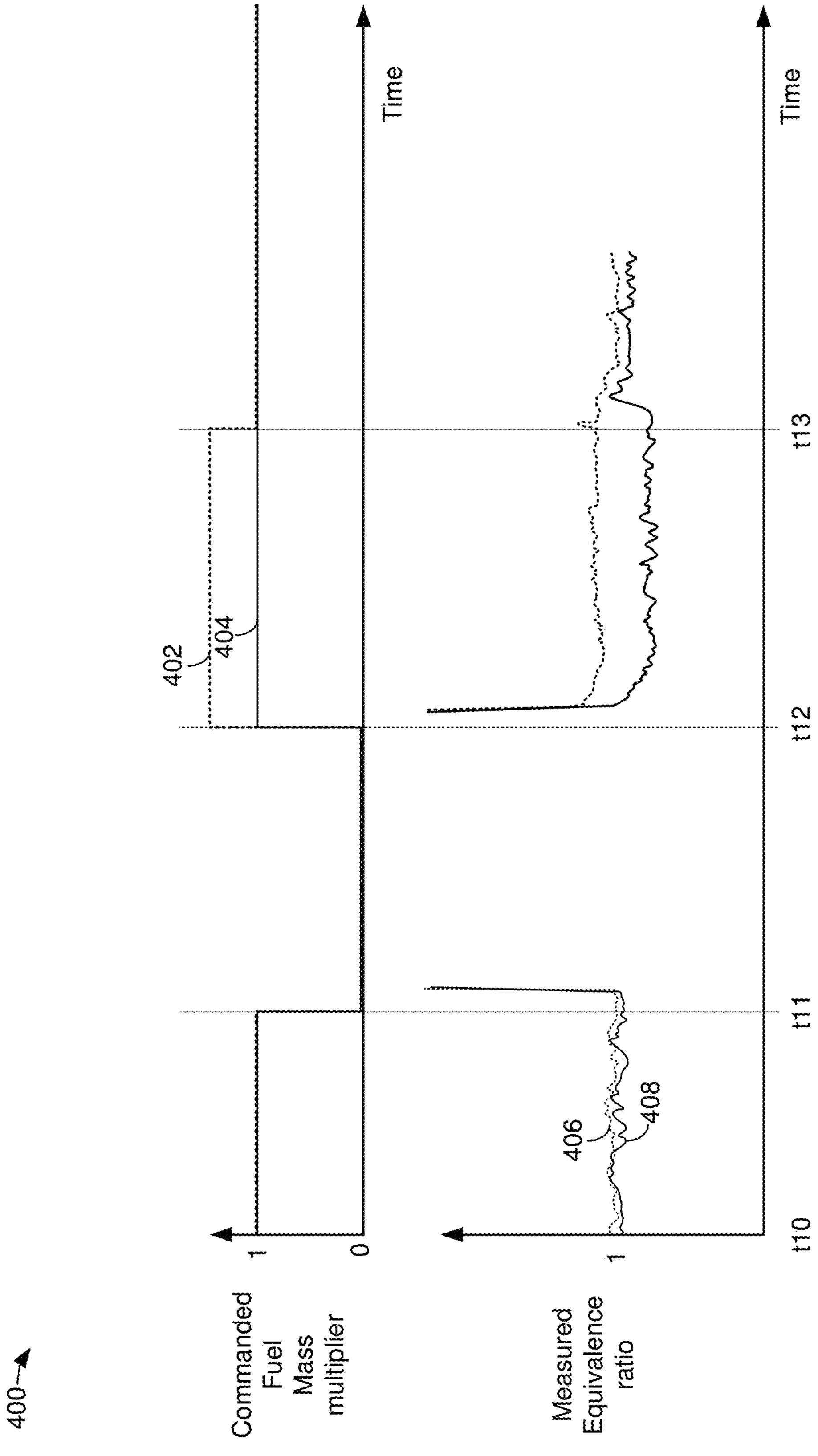
Figure 5:
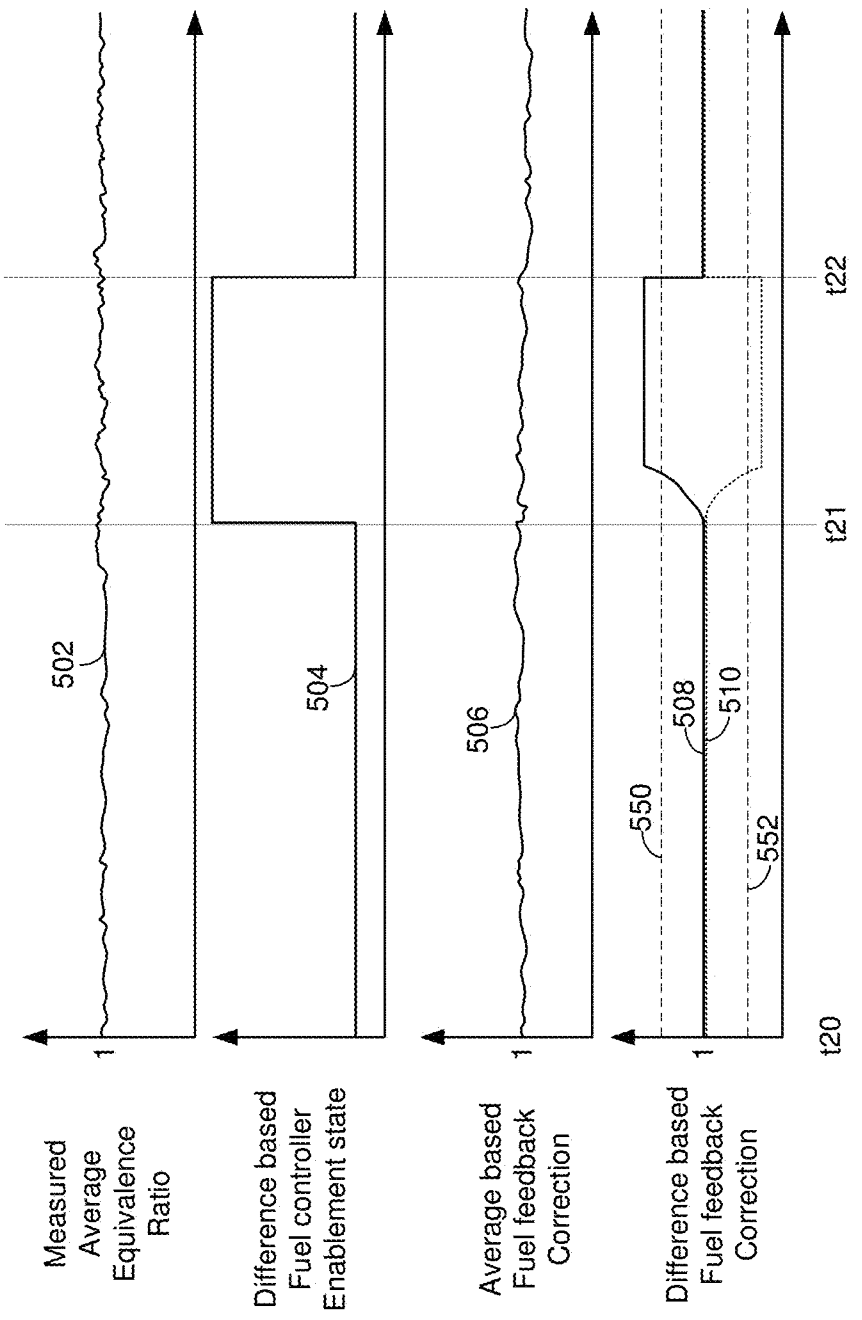
Figure 6:
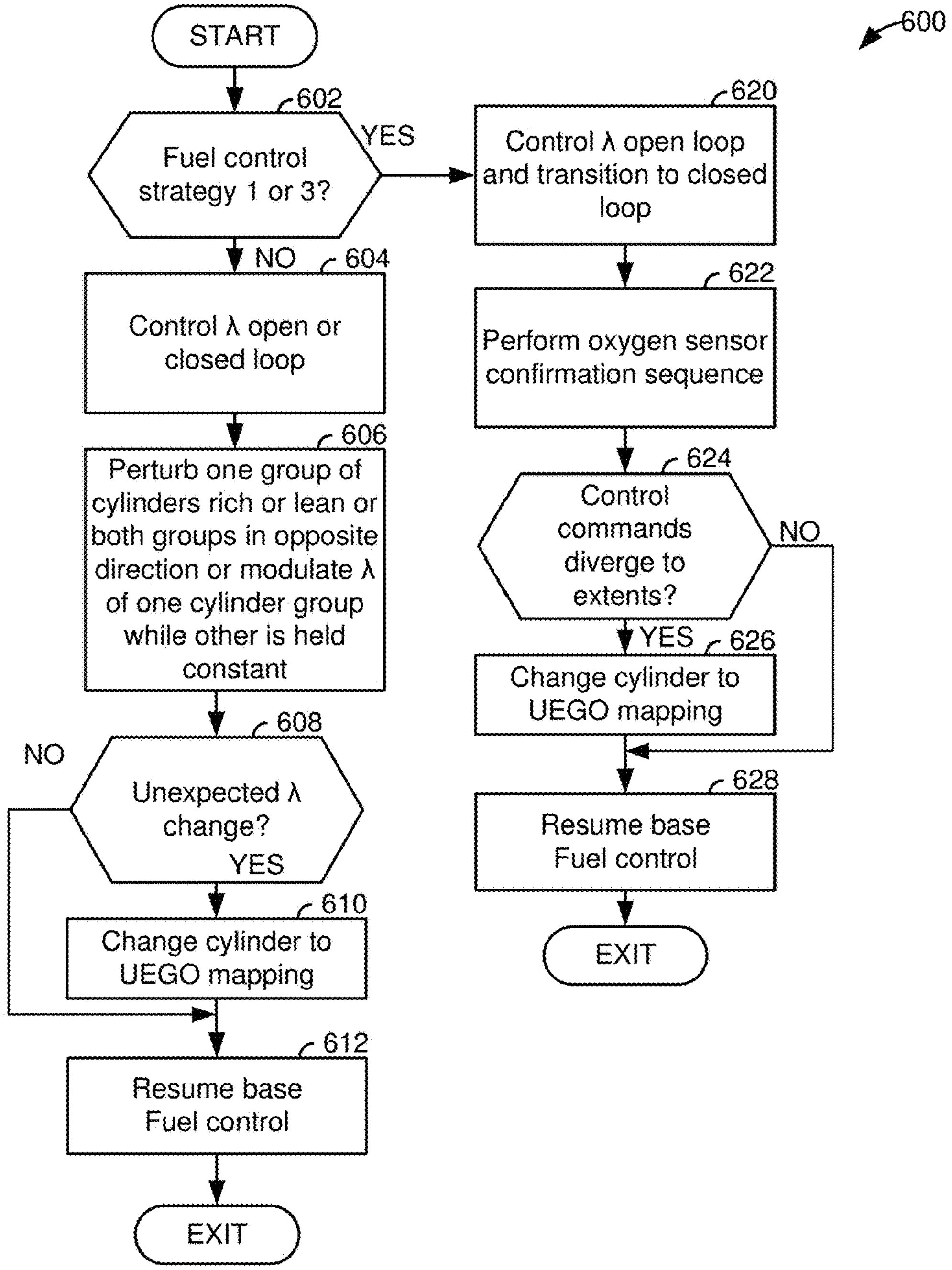
FIG. 6 shows a flowchart of an example method for operating an engine.

An internal combustion engine as shown in FIG. 1 may be operated as described herein. In one example, the method described herein may be applied to a V8 engine as shown in FIG. 2. The engine may respond as shown in FIGS. 3-5. A method for operating and diagnosing operation of an engine fuel system is shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 35, which is known to those skilled in the art as direct injection. Fuel injector 66 delivers liquid fuel in proportion to a voltage pulse width or fuel injector pulse width of a signal from controller 12. Fuel is delivered to fuel injector 66 by a fuel system (not shown) including a fuel tank, fuel pump, and fuel rail (not shown). In other examples, fuel may be injected to each cylinder via a port fuel injector or via a port fuel injector and a direct fuel injector. Thus, an engine may include an actual total number of fuel injectors that is equal to the actual total number of cylinders, or alternatively, the engine may have two fuel injectors for each cylinder. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a distance displaced by human 132; a position sensor 154 coupled to caliper pedal 150 for sensing distance displaced by human 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may receive input and communicate conditions such as degradation of components to light, or alternatively, human/machine interface 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a plan view 200 of engine 10 is shown. Engine 10 is the same engine as shown in FIG. 1, but in FIG. 2, all engine cylinders are shown. In this example, the engine's cylinders are numbered 1 through 8. The cylinders are supplied with air via intake manifold 44. A first bank of cylinders includes cylinders 1-4 and a second bank of cylinders includes cylinders 5-8. Cylinders 1-4 are shown in fluidic communication with exhaust manifold 48 and cylinders 5-8 are shown in fluidic communication with exhaust manifold 220. Each of cylinders 1-8 includes a fuel injector, spark plug, and intake/exhaust valves as shown in FIG. 1. It may also be appreciated that the methods described herein may be applied to V6, V10, and V12 engines.

A first oxygen sensor 126 is shown configured to sense exhaust gases from cylinders numbered 1 and 2. A second oxygen sensor 204 is shown configured to sense exhaust gases from cylinders 3 and 4. A third oxygen sensor 206 is shown configured to sense exhaust gases from cylinders numbered 5 and 7. A fourth oxygen sensor 208 is shown configured to sense exhaust gases from cylinders 6 and 8. There are no cylinders that are downstream of any of the exhaust gas sensors according to exhaust flow from the cylinders as indicated by arrows 230 and 240.

Output of first oxygen sensor 126 may be applied as air-fuel or equivalence ratio feedback for controlling fuel that is supplied to cylinders numbered 1 and 2 when first oxygen sensor 126 is properly wired to controller 12. Output of second oxygen sensor 204 may be applied as air-fuel or equivalence ratio feedback for controlling fuel that is supplied to cylinders numbered 3 and 4 when second oxygen sensor 204 is properly wired to controller 12. Output of third oxygen sensor 206 may be applied as air-fuel or equivalence ratio feedback for controlling fuel that is supplied to cylinders numbered 5 and 7 when third oxygen sensor 206 is properly wired to controller 12. Output of fourth oxygen sensor 208 may be applied as air-fuel or equivalence ratio feedback for controlling fuel that is supplied to cylinders numbered 6 and 8 when fourth oxygen sensor 208 is properly wired to controller 12. Thus, for baseline engine and controller operation, first oxygen sensor 126 is associated with cylinders numbered 1 and 2, second oxygen sensor 204 is associated with cylinders numbered 3 and 4, third oxygen sensor 206 is associated with cylinders numbered 5 and 7, and fourth oxygen sensor 208 is associated with cylinders numbered 6 and 8. However, because the oxygen sensors of a single cylinder bank are in close proximity, it may be possible to miswire the oxygen sensors. For example, output of first oxygen sensor 126 may be applied as air-fuel or equivalence ratio feedback for controlling fuel that is supplied to cylinders numbered 3 and 4 when first oxygen sensor 126 is improperly wired (e.g., miswired) to controller 12. Further, output of second oxygen sensor 204 may be applied as air-fuel or equivalence ratio feedback for controlling fuel that is supplied to cylinders numbered 1 and 2 when second oxygen sensor 204 is improperly wired to controller 12.

The system of FIGS. 1 and 2 provides for a system, comprising: an internal combustion engine comprising eight cylinders, at least eight fuel injectors, and four exhaust gas oxygen sensors, a first oxygen sensor positioned downstream of a first group of two cylinders, a second oxygen sensor positioned downstream of a second group of two cylinders, a third oxygen sensor positioned downstream of a third group of two cylinders, a fourth oxygen sensor positioned downstream of a fourth group of two cylinders; and a controller including executable instructions stored in non-transitory memory that cause the controller to switch cylinders associated with the first group of cylinders and switch cylinders associated with the second group of cylinders in response to an indication of miswiring of one of the first oxygen sensor and the second oxygen sensor. In a first example, the system further comprises additional executable instructions stored in non-transitory memory that cause the controller to switch cylinders associated with the third group of cylinders and switch cylinders associated with the fourth group of cylinders in response to an indication of miswiring of one of the third oxygen sensor and the fourth oxygen sensor. In a second example that may include the first example, the system includes where the indication of miswiring is one or more control parameters diverging to a threshold. In a third example that may include one or both of the first and second examples, the system includes where the indication of miswiring is output of the second oxygen sensor indicating richer than output of the first oxygen sensor when the first group of cylinders is commanded richer than the second group of cylinders. In a fourth example that may include one or more of the first through third examples, the system includes where the indication of miswiring is output of the first oxygen sensor indicating richer than output of the second oxygen sensor when the second group of cylinders is commanded richer than the first group of cylinders. In a fifth example that may include one or more of the first through fourth examples, the system includes where the controller includes additional executable instructions that cause the controller to adjust a first air-fuel ratio or a first equivalence ratio of the first group of two cylinders in response to output of the first oxygen sensor, and additional executable instructions that cause the controller to adjust a second air-fuel ratio or a second equivalence ratio in response to output of the second oxygen sensor. In a sixth example that may include one or more of the first through fifth examples, the system includes where the controller includes additional executable instructions that cause the controller to adjust a third air-fuel ratio or a third equivalence ratio of the third group of two cylinders in response to output of the third oxygen sensor, and additional executable instructions that cause the controller to adjust a fourth air-fuel ratio or a fourth equivalence ratio in response to output of the fourth oxygen sensor.

Turning now to FIG. 3, an example diagnostic sequence for determining whether or not oxygen sensors of a cylinder bank are miswired (e.g., one oxygen sensor is wired with wires meant for a second oxygen sensor) when a first fuel control strategy is applied to an engine is shown. The sequence of FIG. 3 may be provided via the system of FIGS. 1 and 2 in cooperation with the method of FIG. 6. The plots of FIG. 3 are aligned in time and the vertical lines represent times of interest for the operating sequence.

The first fuel control strategy receives output of an oxygen sensor that is associated with two cylinders of a cylinder bank, and a fuel mass feedback correction is generated for the two cylinders that are associated with the oxygen sensor according to the output of the oxygen sensor. For example, oxygen sensor 126 outputs a signal and the amounts of fuel that are delivered to cylinders numbered 1 and 2 of the engine shown in FIG. 2 are adjusted according to the output of oxygen sensor 126. Similarly, the first fuel control strategy receives output of oxygen sensor 204 that is associated with cylinders numbered 3 and 4, and a fuel mass feedback correction is generated for the cylinders numbered 3 and 4 according to the output of oxygen sensor 204. Likewise, fuel delivered to cylinders numbered 5 and 7 may be adjusted responsive to output of oxygen sensor 206 and fuel delivered to cylinders numbered 6 and 8 may be adjusted responsive to output of oxygen sensor 208. The fuel mass feedback correction may be independently computed for each pair of cylinders based on output of an oxygen sensor that is associated with a particular pair of engine cylinders. Therefore, the four feedback controllers of an eight-cylinder engine may be referred to as decoupled fuel controllers.

The first plot from the top of FIG. 3 represents a fuel control signal versus time. The vertical axis indicates the state of fuel control and fuel control is in open loop mode (e.g., the fuel amount is adjusted in response to an amount of air entering the engine and not in response to output of oxygen sensors) when trace 302 is at a higher level near the vertical axis arrow. The fuel control mode is closed-loop when trace 302 is at a lower level that is near the horizontal axis. Trace 302 represents the fuel control state. The horizontal axis represents time and time increases from the left side of the figure to the right side of the figure.

The second plot from the top of FIG. 3 represents fuel mass feedback correction (multiplier) values for cylinder groups of a cylinder bank versus time. The vertical axis indicates fuel mass feedback correction values and the fuel mass feedback correction values increase in the direction of the vertical axis arrow. Solid line trace 304 represents a fuel mass feedback correction for two cylinders (e.g., a first group of cylinders) of a cylinder bank (e.g., cylinders that are adjacent and include a same cylinder head). Dashed line trace 306 represents a fuel mass feedback correction for the two other cylinders (e.g., a second group of cylinders) of the cylinder bank. Horizontal line 350 represents a fuel mass feedback correction (multiplier) lower threshold and horizontal line 352 represents a fuel mass feedback correction (multiplier) upper threshold. The horizontal axis represents time and time increases from the left side of the figure to the right side of the figure.

The third plot from the top of FIG. 3 represents measured equivalence ratio (e.g., Lambda, where Lambda=cylinder air-fuel ratio/cylinder stoichiometric air-fuel ratio) versus time. The vertical axis indicates the measured or observed equivalence ratio observed by an oxygen sensor and the equivalence ratio increases (e.g., becomes leaner) in the direction of the vertical axis arrow. Dashed line trace 308 corresponds to the equivalence ratio measured for the second group of cylinders and solid line trace 310 corresponds to the equivalence ratio observed for the first group of cylinders. The horizontal axis represents time and time increases from the left side of the figure to the right side of the figure.

At time t0, the fuel is supplied to the engine in open-loop mode. The fuel mass feedback correction multiplier value for the first group of cylinders and the second group of cylinders is one (i.e., no feedback or closed-loop adjustment applied). The measured equivalence ratio for the first group of cylinders and the second group of cylinders is near one.

At time t1, the fuel control state switches from open-loop to closed-loop. The fuel control state may change from open-loop to closed loop after an engine is cold started. Shortly after time t1, the fuel mass feedback correction for the first group of cylinders (e.g., trace 304) begins to diverge toward horizontal line 350 (e.g., the fuel mass feedback correction lower threshold) and the fuel mass feedback correction for the second group of cylinders (e.g., trace 306) begins to diverge toward horizontal line 352 (e.g., the fuel mass feedback correction upper threshold) in response to output of a first oxygen sensor and output of a second oxygen sensor being applied to by fuel controllers in an effort to achieve lambda=1 for each of the first and second cylinder groups. This divergence is due to closed-loop control instability as a result of miswired oxygen sensor. The measured equivalence ratio for the first group of cylinders indicates rich and the measured equivalence ratio for the second group of cylinders indicates lean shortly after time t1. The fuel mass feedback correction values and measured equivalence ratio values between time t1 and time t2 are indicative of signals when controller wires for the first oxygen sensor are connected to the second oxygen sensor and vice-versa. In particular, trace 306 exceeds threshold 352 and trace 304 is less than threshold 350, so it may be determined that the engine's closed loop fuel control is unstable and cannot bring the cylinder group's equivalence ratios to a value of one due to miswiring of the oxygen sensors. Further, indications of lean and rich equivalence ratios for the two cylinder groups supports this conclusion.

At time t2, the fuel controller exits closed-loop mode and reenters open-loop operation. The fuel mass feedback correction (multiplier) values revert to one and the measured equivalence ratios move toward values of one.

Thus, the fuel mass feedback correction values may be applied to determine whether or not wires of a first oxygen sensor are connected to a second oxygen sensor and to determine whether or not wires of a second oxygen sensor are connected to a first oxygen sensor. If miswiring is determined, the controller may internally compensate for the miswired sensors and correct the engine cylinder group equivalence ratios.

Referring now to FIG. 4, an example diagnostic sequence for determining whether or not oxygen sensors of a cylinder bank are miswired (e.g., a first oxygen sensor is wired with wires meant for a second oxygen sensor) when a second fuel control strategy is applied to an engine is shown. The sequence of FIG. 4 may be provided via the system of FIGS. 1 and 2 in cooperation with the method of FIG. 6. The plots of FIG. 4 are aligned in time and the vertical lines represent times of interest for the operating sequence.

The second fuel control strategy averages output from two oxygen sensors of a cylinder bank and makes a fuel mass feedback correction to fuel that is supplied to cylinders of the cylinder bank according to the average output of the two oxygen sensors. For example, oxygen sensors 126 and 204 of FIG. 2 outputs signals that added together and divided by two to generate an average output for oxygen sensors 126 and 204. The amounts of fuel that are delivered to cylinders numbered 1-4 of the engine shown in FIG. 2 are adjusted according to the averaged oxygen sensor output. Similarly, the second fuel control strategy receives outputs of oxygen sensors 206 and 208, averages the output, and generates a second fuel mass feedback correction from the averaged output. Fuel injected to cylinders 5-8 is adjusted according to the second fuel mass correction.

The first plot from the top of FIG. 4 represents a commanded fuel mass multiplier value versus time. The vertical axis indicates the value of the commanded fuel mass multiplier and the commanded fuel mass multiplier value increases in the direction of the vertical axis arrow. The commanded fuel mass multiplier makes a cylinder's air-fuel ratio richer as the commanded fuel mass multiplier value increases. Trace 402 represents the commanded fuel mass multiplier value for cylinder numbers 1 and 2 of a cylinder bank. Trace 404 represents the commanded fuel mass multiplier value for cylinder numbers 3 and 4 for the cylinder bank. The horizontal axis represents time and time increases from the left side of the figure to the right side of the figure.

The second plot from the top of FIG. 4 represents measured equivalence ratio (e.g., Lambda, where Lambda=cylinder air-fuel ratio/cylinder stoichiometric air-fuel ratio) versus time. The vertical axis indicates the measured or observed equivalence ratio observed by an oxygen sensor and the equivalence ratio increases (e.g., becomes leaner) in the direction of the vertical axis arrow. Dashed line trace 406 represents the equivalence ratio measured by the first oxygen sensor 126 for cylinder numbers 1 and 2. Solid line trace 408 represents the equivalence ratio measured by the second oxygen sensor 204 for cylinder numbers 3 and 4. The horizontal axis represents time and time increases from the left side of the figure to the right side of the figure.

At time t10, the fuel is supplied to the engine in closed-loop mode. The commanded fuel mass multiplier is based on fuel mass feedback correction. The commanded fuel mass multiplier values for cylinders 1-4 are near one. The measured equivalence ratio for cylinders numbered 1-4 are near one.

At time t11, the engine enters fuel cut-off where fuel injection ceases to cylinders numbered 1-4 when the commanded fuel mass multiplier values are changed to zero (closed-loop mode is deactivated). The measured equivalence ratios for cylinders numbered 1-4 increase and go off scale since fuel is not injected and air flows through cylinder numbers 1-4.

At time t12, the engine returns from fuel cut-off mode and closed-loop mode is reenabled. Following fuel cut-off mode, the cylinder bank is operated with rich air-fuel mixtures on average to reactivate the catalyst. By operating two of four cylinders of a cylinder bank rich, it may be possible to detect swapped UEGO sensor wiring while reactivating the catalyst. The commanded fuel mass multiplier for cylinders numbered 1 and 2 is held above a value of 1 to determine if cylinders numbered 1 and 2 will indicate a rich mixture if the first oxygen sensor 126 is properly wired. The commanded fuel mass multiplier for cylinders numbered 3 and 4 is held at a value of 1 to determine if cylinders numbered 3 and 4 will indicate a nearly stoichiometric mixture if the second oxygen sensor 204 is properly wired. However, in this example, the measured equivalence ratio for cylinders numbered 1 and 2 (dashed line 406) indicates a stoichiometric mixture. The measured equivalence ratio for cylinders numbered 3 and 4 (solid line 408) indicates a richer mixture (e.g., Lambda<1).

Thus, in this example, although cylinders numbered 1 and 2 are supplied with a rich air-fuel mixture, a stoichiometric equivalence ratio is indicated by the oxygen sensor that is supposed to sense output of cylinders numbered 1 and 2. Further, although cylinders numbered 3 and 4 are supplied with a stoichiometric air-fuel mixture, a rich equivalence ratio is indicated by the oxygen sensor that is supposed to sense output of cylinders numbered 3 and 4. Consequently, it may be determined that the wires for the first oxygen sensor 126 are connected to the second oxygen sensor 204 and vice-versa.

Referring now to FIG. 5, another example diagnostic sequence for determining whether or not oxygen sensors of a cylinder bank are miswired (e.g., a first oxygen sensor is wired with wires meant for a second oxygen sensor) when a third fuel control strategy is applied to an engine is shown. The sequence of FIG. 5 may be provided via the system of FIGS. 1 and 2 in cooperation with the method of FIG. 6. The plots of FIG. 5 are aligned in time and the vertical lines represent times of interest for the operating sequence.

The third fuel control strategy averages output from two oxygen sensors of a cylinder bank and makes an average based fuel mass feedback correction to fuel that is supplied to cylinders of the cylinder bank according to the average output of the two oxygen sensors. Additionally, the third fuel control strategy also takes a difference between the outputs of the two oxygen sensors for the first cylinder bank and makes an additional difference based fuel mass feedback correction to fuel that is supplied to cylinders of the first cylinder bank according to the difference between the outputs of the two oxygen sensors. Fuel injected to cylinders 1-4 is adjusted according to the average based fuel mass feedback correction and the difference based fuel mass feedback correction. Similarly, the third fuel control strategy receives outputs of oxygen sensors 206 and 208, averages the output and generates an average based fuel mass feedback correction from the averaged output for the second bank of cylinders. Further, the third fuel control strategy generates a difference between the outputs of oxygen sensors 206 and 208 and generates an additional difference based fuel mass feedback correction for cylinders of the second bank of cylinders according to the difference. Fuel injected to cylinders 5-8 is adjusted according to the average based fuel mass feedback correction and the difference based fuel mass feedback correction.

The first plot from the top of FIG. 5 represents a measured average equivalence ratio for engine cylinders versus time (e.g., average outputs of oxygen sensors 126 and 204). The vertical axis indicates the measured average equivalence ratio and the value of the measured average equivalence ratio increases in the direction of the vertical axis arrow. Trace 502 represents the measured average equivalence ratio for engine cylinders (e.g., cylinders 1-4). The horizontal axis represents time and time increases from the left side of the figure to the right side of the figure.

The second plot from the top of FIG. 5 represents difference based fuel controller enablement state versus time. The vertical axis represents the state of the difference based fuel controller and the difference based fuel controller is enabled or activated when trace 504 is at a higher level that is near the vertical axis arrow. The difference based fuel controller is not enabled when trace 504 is at a lower level that is near the horizontal axis. The horizontal axis represents time and time increases from the left side of the figure to the right side of the figure.

The third plot from the top of FIG. 5 represents an average based fuel mass feedback correction multiplier (e.g., the average of outputs of oxygen sensors 126 and 204 is used to generate an averaged based fuel feedback correction applied to the fuel supplied to cylinders 1-4). The horizontal axis represents time and time increases from the left side of the figure to the right side of the figure.

The fourth plot from the top of FIG. 5, is a plot of difference based fuel controller output values versus time (e.g., fuel mass feedback correction multiplier based on the difference of outputs of oxygen sensors 126 and 204). Solid trace 508 represents output of the difference based fuel controller applied to cylinders 1 and 2, and dashed trace 510 represents output the difference based fuel controller applied to cylinders 3 and 4. The average of trace 508 and trace 510 is equal to 1. Horizontal line 550 represents a difference based fuel controller output upper threshold and horizontal line 552 represents a difference based fuel controller output lower threshold. The horizontal axis represents time and time increases from the left side of the figure to the right side of the figure.

At time t20, the fuel is supplied to the engine in a closed-loop mode where difference based fuel controller is disabled and only average based fuel controller is enabled. The measured equivalence ratio is near a value of one. The average based fuel mass feedback correction (multiplier) is oscillating about a value of one and the difference based fuel controller outputs are equal to one.

At time t21, the difference fuel controller is activated, which causes the outputs of the difference based fuel controller to diverge while maintaining an average output of 1. The measured average equivalence ratio remains about one and the average based fuel mass feedback correction (multiplier) remains near one.

Between time t21 and time t22, the difference based fuel controller remains activated and the outputs of the difference based fuel controller exceed threshold 550 and fall below threshold 552. This may be an indication of miswired oxygen sensors. The measured average equivalence ratio remains about one and the average based fuel mass feedback correction (multiplier) remains near one.

At time t22, the difference based fuel controller is deactivated causing the outputs of the difference based fuel controller to return to a value of one. The measured average equivalence ratio remains near a value of one and the average based fuel mass feedback correction (multiplier) remains near a value of one.

Thus, output of the difference based fuel controller exceeding or being below predetermined thresholds may be indicative of switched wiring for a pair of oxygen sensors of a cylinder bank. Conversely, if the difference based fuel controller outputs do not exceed threshold 550 or fall below threshold 552, then it may be determined that the oxygen sensors of the cylinder bank are not miswired.

Referring now to FIG. 6, a method for operating an engine and detecting miswired oxygen sensors of a cylinder bank is described. The method of FIG. 6 may be incorporated into the system of FIG. 1 as executable instructions stored in non-transitory memory. The method of FIG. 6 may cause the controller of FIG. 1 to receive inputs from one or more sensors described herein and adjust positions or operating states of one or more actuators described herein in the physical world. Method 600 is described in terms of a single cylinder bank, but method 600 may be applied to both cylinder banks of an engine. Method 600 may be performed when an engine is operating and output of each oxygen sensor of the engine is being monitored via the controller.

At 602, method 600 judges whether or not the first or third fuel control strategies have been activated. If so, the answer is yes and method 600 proceeds to 620. Otherwise, the answer is no and method 600 proceeds to 604. If the answer is no, the second fuel control strategy is activated.

At 604, method 600 performs open-loop or closed-loop control of fuel that is delivered to cylinders of a cylinder bank. During open-loop control, method 600 adjusts amounts of fuel that is injected to cylinders of a cylinder bank according to an amount of air that is entering the cylinders of the cylinder bank. During open-loop control, output of oxygen sensors is not used to alter fuel injection amounts. On the other hand, if closed-loop control of fuel is activated, output of oxygen sensors is used via a fuel controller to adjust fuel that is injected to cylinders of a cylinder bank. In one example where a cylinder bank includes two oxygen sensors as shown in FIG. 2, the fuel controller determines an average equivalence ratio from outputs of the cylinder bank's two oxygen sensors and fuel is adjusted to cylinders of the cylinder bank according to the averaged equivalence ratio.

Method 600 operates the engine based on a fuel controller that averages outputs of two oxygen sensors of a cylinder bank and adjusts fuel to engine cylinders according to the average Lambda value for the cylinder bank. Method 600 proceeds to 606.

At 606, method 600 perturbs one group of cylinders of a cylinder bank with a rich or lean fuel adjustment. Alternatively, method 600 may perturb cylinder groups of a cylinder bank with fuel adjustments that are in opposition. For example, a first group of cylinders in a cylinder bank may be perturbed with a lean air-fuel mixture and the second group of cylinders in the cylinder bank may be perturbed with a rich air-fuel mixture. As a further alternative, method 600 may modulate the equivalence ratio of one group of cylinders of a cylinder bank while holding steady an equivalence ratio of a second group of cylinders in the cylinder bank. Method 600 proceeds to 608.

At 608, method 600 judges whether or not there is an unexpected change to a measured Lambda value by one or more oxygen sensors. In one example, method 600 may judge if a Lambda value for gases generated by a first group of cylinders for a cylinder bank that were commanded to a predetermined Lambda value (e.g., 1) is leaner than a first threshold or richer than a second threshold. The second group of cylinders for the cylinder bank may be commanded to operate with a Lambda value that is leaner or richer than stoichiometry. An example of this operation is shown in FIG. 4.

In another example, method 600 may judge if a Lambda value for gases generated by a first group of cylinders for a cylinder bank that were commanded to a predetermined Lambda value (e.g., 1) is leaner than a first threshold when the first group of cylinders were commanded to operate with a rich air-fuel mixture and a second group of cylinders were commanded to operate with a lean air-fuel mixture.

In still another example, method 600 may judge if a Lambda value for gases generated by a first group of cylinders for a cylinder bank that were commanded to oscillate about a predetermined Lambda value (e.g., 1) is not varying as much as may be expected when a second group of cylinders for the cylinder bank were commanded to operate with a constant Lambda air-fuel mixture.

If an unexpected Lambda value is determined during one of the above mentioned air-fuel ratio control procedures, the answer is yes and method 600 proceeds to 610. Otherwise, the answer is no and method 600 proceeds to 612.

At 610, method 600 changes or switches a mapping of cylinders to one or more oxygen sensors. For example, if a controller internally has assigned a first controller input to the first sensor 126 of FIG. 2 and a second input to the second sensor 204, method 600 may reassign the second controller input to the first oxygen sensor 126 and the first controller input to the second oxygen sensor 204 so that feedback is received from an oxygen sensor that is associated with a particular group of cylinders in the fuel control strategy.

Alternatively, method 600 may reassign or switch cylinders that are associated with a particular oxygen sensor. For example, if an unexpected Lambda value is observed via one or more oxygen sensors, cylinders that are associated with the oxygen sensor that observed the unexpected Lambda value within the controller are reassigned to a second oxygen sensor and cylinders that were associated with the second oxygen sensor within the controller may be reassigned to cylinders that were previously assigned to the oxygen sensor that observed the unexpected Lambda value. Reassigning or switching cylinders that are associated with an oxygen sensor in the controller causes the controller to change how the oxygen sensors are applied in feedback control to alter fuel injected to a cylinder. Thus, switching cylinders associated with an oxygen sensor from a first group of cylinders to a second group of cylinders may cause the first group of cylinder's air-fuel ratio to be no longer affected by output of the oxygen sensor and it may also cause the second group of cylinder's air-fuel ratio to be affected by output of the oxygen sensor. Method 600 proceeds to 612.

At 612, method 600 resumes base fuel control and proceeds to exit. The base fuel control may be open-loop fuel control or closed loop fuel control. Method 600 proceeds to exit.

At 620, method 600 performs open-loop fuel control and changes to closed-loop fuel control as shown in FIG. 3. Method 600 may change from open-loop to closed loop operation after a cold engine start or following a fuel cut-off mode when fuel injection to the previously deactivated cylinders is resumed. Method 600 may operate the engine via controlling fuel to two cylinders of a cylinder bank based on output of a first oxygen sensor, and method 600 may control fuel to the other two cylinders of the cylinder bank based on output of a second oxygen sensor. Alternatively, method 600 may adjust fuel supplied to four cylinders of a cylinder bank according to an average of outputs of two oxygen sensors associated with the cylinder bank and a difference between the outputs of the two oxygen sensors associated with the cylinder bank. Method 600 proceeds to 622.

At 622, method 600 performs an oxygen sensor confirmation sequence. The confirmation sequence may allow method 600 to judge whether or not the fuel controller output diverges to indicate improperly wired oxygen sensors (e.g., connectors are connected to unintended oxygen sensors). In one example, method 600 may judge that the fuel controllers diverge if a first group of cylinders of a cylinder bank is commanded to a lean threshold that is not to be exceeded while a second group of cylinders of the cylinder bank are commanded to a rich threshold that is not to be exceeded once closed-loop operation is initiated. The pair of cylinders that diverges from near stoichiometry to a lean or rich threshold may depend on initial conditions.

In some examples, a confirmation sequence may be performed if oxygen sensor output causes the fuel controllers for the cylinders to diverge to opposite thresholds. The confirmation sequence may include perturbing fueling of a pair of cylinders (e.g., rich or lean), and determining whether or not a corresponding Lambda value is observed from an oxygen sensor that is not associated with the cylinders that have been commanded with the rich or lean perturbation. In an alternative confirmation sequence, a first group of cylinders of a cylinder bank may be perturbed with a lean air-fuel mixture and a second group of cylinders of the cylinder bank may be perturbed with a rich air-fuel mixture. If the oxygen sensor that is associated with the first group of cylinders indicates rich and the oxygen sensor associated with the second group of cylinders indicates lean, it may be judged that wiring of the two oxygen sensors is reversed. In still another alternative confirmation sequence, a first group of cylinders of a cylinder bank may be perturbed such that a first cylinder of the group is made rich and a second cylinder of the group is made lean. If the oxygen sensor that is not associated with the first group of cylinders indicates alternating rich and lean Lambda values, it may be judged that wiring of the two oxygen sensors is reversed.

At 624, method 600 judges whether or not the fuel controller output diverges to indicate improperly wired oxygen sensors (e.g., connectors are connected to unintended oxygen sensors). If so, the answer is yes and method 600 proceeds to 626. Otherwise, the answer is no and method 600 proceeds to 628.

At 626, method 600 changes a mapping of cylinders to one or more oxygen sensors. For example, if a controller internally has assigned a first controller input to the first oxygen sensor 126 of FIG. 2 and a second controller input to the second oxygen sensor 204, method 600 may reassign the second controller input to the first oxygen sensor 126 and the first controller input to the second oxygen sensor 204 so that feedback is received from an oxygen sensor that is associated with a particular group of cylinders in the fuel control strategy.

Alternatively, method 600 may reassign cylinders that are associated with a particular oxygen sensor. For example, if an unexpected Lambda value is observed via one or more oxygen sensors, cylinders that are associated with the oxygen sensor that observed the unexpected Lambda value are reassigned to a second oxygen sensor and cylinders that were associated with the second oxygen sensor may be reassigned to cylinders that were previously assigned to the oxygen sensor that observed the unexpected Lambda value. Method 600 proceeds to 628.

At 628, method 600 resumes base fuel control and proceeds to exit. The base fuel control may be open-loop fuel control or closed loop fuel control. Method 600 proceeds to exit.

In this way, if output of one or more oxygen sensors is unexpected (e.g., has moved rich or lean when its associated cylinder has not been commanded rich or lean by injecting more or less fuel to the cylinder) for a particular cylinder, the controller may internally change which engine cylinders are associated with a particular oxygen sensor.

Thus, the method of FIG. 6 provides for a method for operating an engine, comprising: monitoring exhaust gases of a first group of cylinders of a cylinder bank of the engine via a first oxygen sensor; monitoring exhaust gases of a second group of cylinders of the cylinder bank via a second oxygen sensor; and switching cylinders associated with the first group of cylinders and switching cylinders associated with the second group of cylinders in response to an indication of miswiring of one of the first oxygen sensor and the second oxygen sensor. In a first example, the method includes where switching cylinders associated with the first group of cylinders and switching cylinders associated with the second group of cylinders includes switching cylinders associated with the first group of cylinders to the second group of cylinders and switching cylinders associated with the second group of cylinders to the first group of cylinders. In a second example that may include the first example, the method includes where switching cylinders associated with the first group of cylinders and switching cylinders associated with the second group of cylinders causes fuel adjustments to the first group of cylinders to be made in response to output of the second oxygen sensor and causes fuel adjustments to the second group of cylinders to be made in response to output of the first oxygen sensor. In a third example that may include one or both of the first and second examples, the method includes where the indication of miswiring is a fuel control parameter diverging to a threshold extent. In a fourth example that may include one or more of the first through third examples, the method includes where the fuel control parameter diverges to the threshold extent during closed-loop fuel control. In a fifth example that may include one or more of the first through fourth examples, the method includes where the indication of miswiring is based on commanding enrichment of the first group of cylinders and detecting enrichment of the second group of cylinders. In a sixth example that may include one or more of the first through fifth examples, the method includes where the indication of miswiring is based on commanding enrichment of the second group of cylinders and detecting enrichment of the first group of cylinders. In a seventh example that may include one or more of the first through sixth examples, the method further comprises: monitoring exhaust gases of a third group of cylinders of a second cylinder bank via a third oxygen sensor; monitoring exhaust gases of a fourth group of cylinders of the cylinder bank via a fourth oxygen sensor; and switching cylinders associated with the third group of cylinders and switching cylinders associated with the fourth group of cylinders in response to an indication of miswiring of one of the third oxygen sensor and the fourth oxygen sensor.

The method of FIG. 6 also provides for a method for operating an engine, comprising: operating the engine in a fuel cut-off mode; commanding a first group of cylinders of a cylinder bank of the engine to a first equivalence ratio and commanding a second group of cylinders of the cylinder bank to a second equivalence ratio in response to exiting the fuel cut-off mode; and switching cylinders associated with the first group of cylinders with cylinders associated with the second group of cylinders in response to a first oxygen sensor indicating the first group of cylinders operating at the second equivalence ratio. In a first example, the method further comprises switching cylinders associated with the second group of cylinders with cylinders associated with the first group of cylinders in response to a second oxygen sensor indicating the second group of cylinders operating at the first equivalence ratio. In a second example that may include the first example, the method further comprises operating the second group of cylinders in response to output of the first oxygen sensor after switching cylinders associated with the first group of cylinders with cylinders associated with the second group of cylinders. In a third example that may include one or both of the first and second examples, the method includes where operating the second group of cylinders includes adjusting an equivalence ratio of the second group of cylinders. In a fourth example that may include one or more of the first through third examples, the method includes where the first equivalence ratio is different than the second equivalence ratio.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, the method comprising:
- monitoring exhaust gases of a first group of cylinders of a first cylinder bank of the engine via a first oxygen sensor associated with the first group of cylinders;
- monitoring exhaust gases of a second group of cylinders of the first cylinder bank via a second oxygen sensor associated with the second group of cylinders;
- determining whether a miswiring of at least one of the first oxygen sensor and the second oxygen sensor has occurred in response to an output from the first oxygen sensor or an output from the second oxygen sensor;
- switching association of the first oxygen sensor from the first group of cylinders to the second group of cylinders and switching association of the second oxygen sensor from the second group of cylinders to the first group of cylinders when the miswiring is determined to have occurred; and
- injecting fuel to the engine in response to the output of the first oxygen sensor and the output of the second oxygen sensor with the switched associations.

2. The method of claim 1, wherein the switching of the association of the first oxygen sensor causes a control of an air-fuel ratio of the first group of cylinders to not be affected by the output of the first oxygen sensor.

3. The method of claim 1, wherein the switching of the association of the first oxygen sensor and the switching of the association of the second oxygen sensor causes fuel adjustments to the first group of cylinders to be made in response to the output of the second oxygen sensor and causes fuel adjustments to the second group of cylinders to be made in response to the output of the first oxygen sensor.

4. The method of claim 1, wherein the miswiring is determined to have occurred when a fuel control parameter diverges to a threshold extent.

5. The method of claim 4, wherein the miswiring is determined to have occurred when the fuel control parameter diverges to the threshold extent during a closed-loop fuel control.

6. The method of claim 1, wherein the miswiring is determined to have occurred when an enrichment of the first group of cylinders is commanded and an enrichment of the second group of cylinders is detected via the second oxygen sensor.

7. The method of claim 1, wherein the miswiring is determined to have occurred when an enrichment of the second group of cylinders is commanded and an enrichment of the first group of cylinders is detected via the first oxygen sensor.

8. The method of claim 1, further comprising:
- monitoring exhaust gases of a third group of cylinders of a second cylinder bank of the engine via a third oxygen sensor associated with the third group of cylinders;
- monitoring exhaust gases of a fourth group of cylinders of the second cylinder bank via a fourth oxygen sensor associated with the fourth group of cylinders;
- determining whether a second miswiring of at least one of the third oxygen sensor and the fourth oxygen sensor has occurred in response to an output from the third oxygen sensor or an output from the fourth oxygen sensor;
- switching association of the third oxygen sensor from the third group of cylinders to the fourth group of cylinders and switching association of the fourth oxygen sensor from the fourth group of cylinders to the third group of cylinders when the second miswiring is determined to have occurred; and
- injecting fuel to the engine in response to the output of the third oxygen sensor and the output of the fourth oxygen sensor with the switched associations.

9. An internal combustion engine system, comprising:
- a first cylinder bank including a first pair of cylinders and a second pair of cylinders;
- a first oxygen sensor positioned downstream of the first pair of cylinders, and a second oxygen sensor positioned downstream of the second pair of cylinders;
- a second cylinder bank including a third pair of cylinders and a fourth pair of cylinders;
- a third oxygen sensor positioned downstream of the third pair of cylinders, and a fourth oxygen sensor positioned downstream of the fourth pair of cylinders;
- at least one fuel injector associated with each cylinder; and
- a controller including executable instructions stored in non-transitory memory that cause the controller to:
  - determine whether a first miswiring of at least one of the first oxygen sensor and the second oxygen sensor has occurred in response to an output from the first oxygen sensor or an output of the second oxygen sensor,
  - switch association of the first oxygen sensor from the first pair of cylinders to the second pair of cylinders and switch association of the second oxygen sensor from the second pair of cylinders to the first pair of cylinders when the first miswiring is determined to have occurred, and adjust fuel injection to the first cylinder bank in response to the output of the first oxygen sensor and the output of the second oxygen sensor with the switched associations.

10. The internal combustion engine system of claim 9, wherein the controller further includes additional executable instructions that cause the controller to:

determine whether a second miswiring of at least one of the third oxygen sensor and the fourth oxygen sensor has occurred in response to an output from the third oxygen sensor or an output of the fourth oxygen sensor, switch association of the third oxygen sensor from the third pair of cylinders to the fourth pair of cylinders and switch association of the fourth oxygen sensor from the fourth pair of cylinders to the third pair of cylinders when the second miswiring is determined to have occurred, and adjust fuel injection to the second cylinder bank in response to the output of the third oxygen sensor and the output of the fourth oxygen sensor with the switched associations.

11. The internal combustion engine system of claim 10, wherein the controller further includes additional executable instructions that cause the controller to:

adjust a third air-fuel ratio of the third pair of cylinders in response to the output of the fourth oxygen sensor, and adjust a fourth air-fuel ratio of the fourth pair of cylinders in response to the output of the third oxygen sensor when the second miswiring is determined to have occurred.

12. The internal combustion engine system of claim 9, wherein the first miswiring is determined to have occurred when one or more control parameters diverge to a threshold.

13. The internal combustion engine system of claim 9, wherein the first miswiring is determined to have occurred when the first pair of cylinders is commanded richer than the second pair of cylinders and the output of the second oxygen sensor indicates a richer air-fuel ratio than the output of the first oxygen sensor.

14. The internal combustion engine system of claim 9, wherein the first miswiring is determined to have occurred when the second pair of cylinders is commanded richer than the first pair of cylinders and the output of the first oxygen sensor indicates a richer air-fuel ratio than the output of the second oxygen sensor.

15. The internal combustion engine system of claim 9, wherein the controller further includes additional executable instructions that cause the controller to:

adjust a first air-fuel ratio of the first pair of cylinders in response to the output of the second oxygen sensor, and adjust a second air-fuel ratio of the second pair of cylinders in response to the output of the first oxygen sensor when the first miswiring is determined to have occurred.

16. A method for operating an engine, comprising:

operating the engine in a fuel cut-off mode;

commanding a first group of cylinders of a first cylinder bank of the engine to a first air-fuel ratio and commanding a second group of cylinders of the first cylinder bank to a second air-fuel ratio in response to an exiting of the fuel cut-off mode;

monitoring exhaust gases of the first group of cylinders via a first oxygen sensor associated with the first group of cylinders;

monitoring exhaust gases of the second group of cylinders via a second oxygen sensor associated with the second group of cylinders;

determining a miswiring of the first oxygen sensor and the second oxygen sensor has occurred in response to the first oxygen sensor indicating the first group of cylinders is operating at the second air-fuel ratio;

switching association of the first oxygen sensor from the first group of cylinders to the second group of cylinders and switching association of the second oxygen sensor from the second group of cylinders to the first group of cylinders when the miswiring is determined to have occurred; and injecting fuel to the engine in response to an output of the first oxygen sensor and an output of the second oxygen sensor with the switched associations.

17. The method of claim 16, further comprising determining the miswiring has occurred in response to the second oxygen sensor indicating the second group of cylinders is operating at the first air-fuel ratio.

18. The method of claim 16, further comprising operating the second group of cylinders in response to the output of the first oxygen sensor after the switching of the association of the first oxygen sensor.

19. The method of claim 18, wherein the operating of the second group of cylinders includes adjusting the second air-fuel ratio of the second group of cylinders.

20. The method of claim 16, wherein the first air-fuel ratio is different from the second air-fuel ratio.

* * * * *